Patented June 27, 1939

2,164,291

UNITED STATES PATENT OFFICE 2,164,291

HYDROGENATED OIL PRODUCT

Leslie G. Jenness, Englewood, N. J., assignor to Intermetal Corporation, Newark, N. J., a corporation of Delaware No Drawing. Original application February 4, 1938, Serial No. 188,785. Divided and this application October 5, 1938, Serial No. 233,475

7 Claims. (Cl. 260—409)

This invention relates to the selective hydrogenation of glyceride oils and more particularly to a process of selectively hydrogenating glyceride oils which contain substantial quantities of fatty acid radicals having more than double bonds to produce products having improved keeping qualities. The present application constitutes a continuation-in-part of my copending application Serial No. 44,635, filed October 11, 1935, which is a continuation-in-part of my copending applications Serial Nos. 13,973, 13,974, 13,975, and 13,976, all filed March 4, 1935.

This invention is particularly adapted for the conversion of glyceride oils having notoriously poor keeping qualities, such as soya bean oil and fish oils, into palatable liquid products having keeping qualities comparable to or exceeding those of the better vegetable oils, for example, such oils as corn, sesame, or sunflower oils. Also, the invention contemplates hydrogenating the thus treated oils to highly stable semi-solid fats of lard-like or butter-like consistency having proper physical characteristics for shortening or margarine. In order to prepare such highly stable semi-solid fats the keeping qualities must first be fixed in the oil by first preparing the highly stable liquid oil. The conditions of hydrogenation for preparing the liquid oils are, in general, different from those for converting the liquid oil into a semi-solid fat having proper physical characteristics.

Olein is the most desirable constituent of the liquid oil. I have found, however, that the composition of the product on the basis of the total fatty acid radicals present does not entirely determine keeping qualities. That is, I have found that products having substantially the same fatty acid radical content and iodine number may be prepared from the same original oil so as to have widely different keeping qualities depending upon the method of preparation. This variation in keeping qualities in oils having the same composition with respect to the total fatty acid radicals present, can only be explained on the basis that mixed glycerides are formed by the present process and that an oil having the greatest number of mixed glyceride molecules has the greatest keeping qualities.

It is, therefore, an object of the invention to provide a process of selectively hydrogenating glyceride oils having poor keeping qualities to produce liquid oils having high keeping qualities.

Another object of the invention is to provide a process of hydrogenating liquid glyceride oils containing fatty acid radicals having more than two double bonds to produce liquid oils having improved keeping qualities.

Another object of the invention is to provide a process of selectively hydrogenating glyceride oils to form relatively large quantities of mixed glycerides.

Another object of the invention is to provide a process for substantially completely converting unsaturates having more than two double bonds into lower unsaturates, at an early stage in the process, to enable the formation of olein containing mixed glycerides in a liquid oil.

Another object is to provide a process of hydrogenating in which the hydrogenation reaction is maintained uniform throughout the body of the material being hydrogenated in order to prepare liquid oils having high keeping qualities fixed therein.

Another object of the invention is to control the agitation, rate of hydrogen absorption, and contact of the hydrogen with the oil so as to maintain the hydrogenation reaction uniform throughout the body of material being hydrogenated.

Another object is to provide a process of making semi-solid fats, such as margarine or shortening, in which liquid glyceride oils containing fatty acid radicals are first hydrogenated to fix high keeping qualities therein while the oil is still liquid and then further hydrogenated to produce semi-solid fats having the desired physical characteristics.

Another object is to provide a new liquid hydrogenated oil product having high keeping qualities.

A further object of the invention is to provide a process of forming highly stable semi-solid fats from said liquid oil products.

A still further object of the invention is to provide a new hydrogenated semi-solid fat product having high keeping qualities.

Other objects and advantages of the invention will appear in the following detailed description of my invention.

The selective hydrogenation process of the present invention for the making of liquid oils having high keeping qualities is preferably carried out in a closed chamber provided with agitating means and suitable inlet and discharge passages for the oil and hydrogen. An example of a suitable apparatus is that disclosed in the patent to Valentine No. 1,856,128. A suitable catalyst is employed and is mixed with the oil, the mixture is agitated while being maintained at a relatively high temperature, and hydrogen gas is introduced into the chamber, preferably under pressure so as to be dissolved therein and carried throughout the body of the oil by the currents due to agitation. I have found that for selective hydrogenation it is important to carry out the process under conditions of high temperature, thorough agitation, a relatively low rate of hydrogen absorption, and uniformity of hydrogenation reaction throughout the mass of oil being treated, and to employ a selective catalyst. The conditions of hydrogenation must be such that unsaturates having more than two double bonds are substantially eliminated and the Wesson rancidity time of the liquid oil brought to at least 10 hours by the time the iodine number has been dropped to 110.

The temperature at which the process is carried on has an important effect upon the selectivity of the hydrogenation. In general, the higher the temperature, the more selective is the process toward hydrogenating the higher unsaturates and preventing the hydrogenation of olein into stearin. However, higher temperatures also favor the formation of iso-olein. For this reason a catalyst which is selective not only against the formation of saturates but against the formation of iso-olein is preferably employed. The temperature of hydrogenation contemplated by this invention falls within a range from 280° to 380° F. and preferably between 300° and 330° F., the optimum temperature being approximately 320° F. I have found that a slow uniform reaction throughout the mass of oil being treated is of great importance. The nature of the agitation, the amount of catalyst employed, the rate of gas absorption, and the hydrogen pressure as well as the temperature during hydrogenation must be carefully correlated in order to produce a liquid oil having high keeping qualities from oils having unsaturates with more than two double bonds.

An example of a suitable selective catalyst is the foraminate nickel catalyst prepared by leaching with caustic soda and reducing a precipitated and dried aggregate consisting of approximately 6NiO.CrO$_4$, disclosed in my copending application Serial No. 13,972, filed March 30, 1935. Another example of a suitable selective catalyst is the foraminate nickel catalyst prepared by leaching with caustic soda a dried aggregate precipitated from a solution containing nickel sulphate and aluminum sulphate, the aggregate having a molecular ratio of NiO to Al$_2$O$_3$ of approximately 13 to 1. This catalyst is also disclosed in my copending application above referred to. Both of these catalysts are suitable although the former is somewhat more selective against the formation of iso-olein. Certain other catalysts, for example, those known in the trade as "Formate" catalysts or "Raney" catalysts, can be employed with fairly good results. With such catalysts considerable improvement over conventionally hydrogenated oils can be obtained by the present invention, but the stability of such oils does not approach that obtained when the more selective catalysts first mentioned are employed. Any other suitable catalyst having the requisite selective characteristics may be employed.

I have further found that there are at least two different types or orders of selectivity. The first is the recognized tendency of the higher unsaturates to combine with hydrogen before the lower unsaturates. The extent to which this type of selectivity may be carried appears to be largely dependent upon the nature of the catalyst itself as well as the conditions of hydrogenation. The highly selective catalysts contemplated by the present invention, such as the foraminate catalysts first mentioned, even under somewhat unfavorable conditions produce a much greater maximum olein content than the less selective catalysts under the most favorable conditions.

The second type of selectivity is not concerned with the relative total proportions of the various unsaturates in the resulting product but appears to affect selective hydrogenation within the glyceride molecules and can be accomplished only by carefully controlling the conditions of hydrogenation. I have found that the conversion of even one of the acid radicals of a normal unsaturated glyceride molecule into a radical of less unsaturation makes this molecule more stable against hydrogenation at least in the presence of quantities of the lower unsaturate. Thus, if the reaction throughout the mass is made sufficiently slow and uniform, such mixed glyceride molecules are carried away from the catalytic surface before being converted to a normal glyceride, and the normal glycerides of a given unsaturation are selectively converted into mixed glycerides. These mixed glycerides are not only more stable against further hydrogenation but are also more stable against oxidation and are more soluble in more stable lower unsaturates so as to be protected from oxidation than are normal glycerides having the same degree of unsaturation as the most unsaturated radical of the mixed glyceride.

By hydrogenating an oil containing glycerides having more than two double bonds under the conditions of uniformity of reaction contemplated by this invention, it is possible to form a liquid oil in which all of the unsaturates having more than two double bonds have been hydrogenated and substantially all of the two double bond unsaturates appear to be present as mixed glycerides. The resultant liquid oil is extremely stable and in general more stable than cottonseed oil. A stable oil can be produced even though small amounts of three double bond acid radicals should remain in the oil. However, if such radicals are present in the hydrogenated oil, it tends to go "off flavor" before rancidity develops, and when rancidity does develop, the characteristic odor of the oil also develops. It is, therefore, desirable to completely convert all of the radicals containing more than two double bonds to lower unsaturates. In accordance with this invention, the linolenic content of soya bean oil can be completely converted at an iodine number of 117 to 112, which is before any appreciable increase in saturates occurs and while the oil is substantially as liquid as it was originally. Also in the case of fish oils, the clupanodonic acids disappear along with their "fish" odor at an iodine number of approximately 120 to 130, and the three double bond acid radicals are completely converted at an iodine number at least as high as 110.

The uniform slow reaction necessary to form mixed glycerides may be secured in various ways, all of which involve thorough agitation and a low rate of gas absorption.

When employing a relatively large amount of catalyst, for example, 0.2% of the weight of the oil, and relatively high hydrogen pressure, for example, 10 to 25 lbs. per square inch, any appreciable amount of splashing, in contact with an atmosphere of hydrogen, must be prevented. I have found that there is a tendency for the molecules in drops of oil or spray which carry suspended catalyst, to be completely hydrogenated to lower unsaturates in the hydrogen atmosphere above the oil. This results in the formation of normal glycerides instead of the desirable mixed glycerides. Thus, under the conditions mentioned, agitation should be as intense as possible without causing splashing at the surface of the oil. An example of such agitation is that produced in an apparatus similar to that shown in the patent to Valentine No. 1,856,128 having two 6-inch impellers in a tank holding approximately 160 lbs. of oil, with the oil covering the top impeller and the impellers rotating at a speed just below that at which splashing occurs. A speed of approximately 300 R. P. M. was found to be suitable in a specific apparatus. By overloading the apparatus so as to bring the oil considerably above the upper impeller, it was possible to somewhat increase the speed without splashing.

I have also found that the uniformity of reaction can be accomplished by using a very small amount of catalyst and a low hydrogen pressure even though splashing occurs. In certain existing commercial installations of hydrogenating apparatus, it is impossible to provide for thorough agitation free from splashing without extensive alterations in the apparatus. By using a small amount of catalyst and a low hydrogen pressure, for example, .05% catalyst and a hydrogen gauge pressure of 2½ lbs. per square inch, it is possible to slow down the reaction in the spray in contact with the hydrogen atmosphere above the oil until localized concentrations are avoided and the reaction proceeds at a substantially uniform rate throughout the oil.

It is also possible to overcome the rapid localized reactions due to splashing by maintaining an atmosphere of an inert gas, for example, carbon dioxide, above the surface of the oil. One way of accomplishing this is to mix a small amount of carbon dioxide with the hydrogen entering the hydrogenating apparatus. By regulating the amount of hydrogen and carbon dioxide delivered to the hydrogenating apparatus, so that hydrogen is substantially all combined with the oil, and directing the mixture of gases into the lower portion of the body of oil, the carbon dioxide collects above the oil and can be gradually bled therefrom to maintain the proper pressure in the conversion chamber. In this manner a relatively large amount of catalyst (.2 to .25%) and a relatively high hydrogen pressure (10 to 25 lbs. per square inch) may be employed even though the particular apparatus and rate of agitation causes violent splashing. No local rapid reactions with consequent increase in the formation of normal glycerides take place.

In order to secure uniformity of reaction and the formation of mixed glycerides, the rate of gas absorption must be maintained relatively low. The more intense the agitation so long as there are no local rapid reactions due to splashing, the higher is the rate of gas absorption which can be employed since the partially hydrogenated molecules are more rapidly removed from the surface of the catalyst. Under given conditions of temperature agitation and amount of catalyst, the rate of gas absorption varies with the hydrogen pressure and can be conveniently expressed as the drop in iodine number per hour. It has been found that the approximate maximum rate of hydrogen absorption which results in the formation of mixed rather than normal glycerides and therefore the best possible oil is a drop of 10 to 15 iodine numbers per hour dependent upon the conditions of hydrogenation. If all of the other conditions of temperature, pressure, agitation, etc., are favorable, this rate of hydrogen absorption can be exceeded and an oil having a Wesson time of at least 10 hours at 110 iodine number prepared, especially if a relatively good grade of oil is being processed. Thus rates equivalent to drops of 17 or even 20 iodine numbers per hour can sometimes be employed with other conditions favorable, if it is desired to produce only an acceptable oil rather than the best possible oil. The important consideration is that the hydrogenation rate should not exceed that which will produce an oil having a Wesson rancidity time at least as great as approximately 10 hours at 110 iodine number.

The pressure necessary for the rate of hydrogen absorption will vary between 1 or 2 up to 50 lbs. per square inch gauge also dependent upon the other conditions of hydrogenation. I have found that the hydrogen pressure can be increased in the particular apparatus mentioned up to 50 lbs. per square inch, and probably higher and still enable an acceptable oil to be produced, by decreasing the impeller speed below the 300 R. P. M. found to be just below the splashing point. It was found that a speed of 260 R. P. M. produced a rate of gas absorption of approximately 10 iodine numbers drop per hour at 50 lbs. per square inch hydrogen pressure and that a high keeping quality oil resulted. Thus the higher the hydrogen pressure, the lower the intensity of agitation must be in order to maintain the required rate of gas absorption. However, the intensity of agitation must not fall below that necessary to remove partially hydrogenated molecules of a given unsaturate from the catalytic surface before they are hydrogenated to a normal glyceride if the high keeping quality oil is desired. Also the selectivity is not as good as in the case of more intense agitation and lower hydrogen pressure.

*Example I*

As a specific example, 160 pounds of soya bean oil were hydrogenated at a temperature of 310° F. and a pressure varying between 10 and 25 pounds per square inch. Approximately 0.2% of the catalyst made from the $6NiO.CrO_3$ aggregate was employed and the mixture thoroughly agitated in a turbo mixer unit having two 6-inch impellers revolving at 300 R. P. M., at which speed practically no splashing occurred. The time of hydrogenation was one hour and forty-five minutes, and the drop in iodine number was 23, giving a rate of gas absorption of 13.1 iodine numbers per hour. The hydrogen pressure was varied between the above limits to maintain the reaction slow and uniform.

The composition and iodine number of the original oil and product obtained were as follows:

| | Original oil | Hydrogenated liquid oil |
|---|---|---|
| Saturates percent | 9.4 | 10.1 |
| Olein do | 33.0 | 53.8 |
| Linolein do | 54.7 | 35.1 |
| Linolenin do | 2.9 | 0.0 |
| Iodine number | 136 | 113 |

It will be noted that the linolenin was completely converted; the linolein content reduced from 54.7% to 35.1%; the olein content increased from 33% to 53.8%; the saturated content remained substantially unchanged; and the linolein content decreased to less than two thirds of its original content. The proportion of olein appearing as iso-olein was less than 2%, which did not interfere with the oil being liquid at room temperature. The oil was extremely palatable and improved in color and showed a rancidity test of approximately 14 hours as determined by the Wesson rancidity test of 212° F. This keeping time is superior to that of the best natural vegetable oils commercially obtainable and is even superior to some of the commercial semi-solid fats now on the market.

As hereinbefore stated, the method disclosed is also applicable to oils such as fish oils having even higher unsaturates than linolenin. The composition of these fish oils is much more complex than that of the vegetable oils hereinbefore discussed since they contain mixtures of $C_{18}$, $C_{20}$, and $C_{22}$ (and possibly others) acid glycerides.

Example II

A sample of sardine oil was analyzed and found to contain 15 to 17% of clupanodonic acid glycerides and approximately 6% of acid glycerides containing three double bonds. A charge of 160 lbs. of this sardine oil was hydrogenated with .2% catalyst under the same conditions and with the same catalyst as the previous example. The iodine number of the original oil was 185, and this was reduced to 103 in approximately seven hours such that the rate of gas absorption was approximately a drop of 11.7 iodine numbers per hour. In such processes all of the clupanodonic acids disappear at an iodine number of approximately 140, and the three double bond unsaturates are substantially all converted at an iodine number of 110 and completely disappear between an iodine number of 103 to 107. The fishy odor of the original oil also disappears at the same time as the clupanodonic acids (about 140 iodine number). This oil was entirely liquid and showed a rancidity test of approximately eleven hours at an iodine number of 110. As to the keeping qualities, therefore, this hydrogenated fish oil is considerably superior to cottonseed oil.

The invention is also applicable to blends of fish and soya bean oil as shown in the following example:

Example III

A charge of oil containing 120 pounds of neutralized and bleached sardine oil and 40 pounds of neutralized and bleached soya bean oil, forming 160 pounds of 75% fish oil and 25% soya bean oil, to which was added 2.72 pounds of completely hardened neutralized and bleached sardine oil for plasticity control, was hydrogenated in the turbo mixer of Example I with an agitator speed of 304 R. P. M. at which substantially no splashing occurred. The process was carried on at temperature of 320° F. in the presence of 0.15% nickel catalyst of the type used in Example I and at a hydrogen pressure of 5 pounds per square inch. The charge was hydrogenated from an iodine number of 165.8 to 107 at an average rate corresponding to a drop of 13 iodine numbers per hour and the resultant liquid oil had a Wesson rancidity time of 12 hours so that the Wesson time was in excess of 10 hours at an iodine number of 110.

Example IV

As an example, using inert gas, a charge of 160 pounds of 75% fish oil and 25% soya bean oil was hydrogenated at a gas pressure of 35 pounds per square inch with 0.2 nickel catalyst of the same type as that employed in Example I at a temperature of 300 to 310° F. and an impeller speed of 565 R. P. M., which was sufficient to cause intense splashing. The hydrogenating gas employed was approximately 75% hydrogen and 25% carbon dioxide and was introduced at the bottom of the converter. In a very short time the free gas space above the oil consisted practically entirely of carbon dioxide, which was gradually bled off while maintaining a gas pressure of 35 pounds per square inch. The time required to drop the iodine number from 171 to 103 was seven hours or approximately 10 iodine numbers per hour. The product was free from acid radicals containing more than two double bonds and had a Wesson rancidity time of eleven hours.

Example V

As another example in which a small amount of catalyst and low hydrogenation pressure was employed to secure uniformity of reaction, a 15,000 pound batch of soya bean oil was hydrogenated in a commercial hydrogenating plant. Since it was impossible, unless alterations were made, to lower the speed of the agitating equipment below the splashing point and an inert gas was not available, a small quantity, 0.05%, of the $6NiO:CrO_4$ nickel catalyst was employed and a hydrogen pressure of 2½ pounds per square inch gauge maintained. The oil was brought to 310° F. while mixed with the catalyst and the hydrogen introduced. A temperature of 320° F. was maintained during the major part of the conversion. A time of 1½ hours was required to bring the iodine number of the oil from 136 to 113, which is a rate of approximately 15.3 iodine numbers per hour. A sample of this liquid product was tested and showed a Wesson rancidity time of 16 hours after the usual steam deodorization.

The liquid oil products made from oils containing unsaturates having more than two double bonds are free from such unsaturates at an iodine number of approximately 110 or higher and they have a Wesson rancidity time of at least 10 hours at this iodine number, and, in general, have keeping and shortening values greater than any known natural glyceride oil. The keeping time is in all cases greater than that of cottonseed oil, and the oils do not revert to a product having the characteristic odor of the original oil even at rancidity. While the liquid oil products resulting from the process of the present invention when using prior catalysts such as the "Formate" or "Raney" catalysts have longer keeping times than any natural liquid oil, they do not approach in keeping qualities oils produced by employing the more selective foraminate catalysts.

All of the liquid oil products of the present invention have utility as liquid shortenings, salad oils, and compounding oils, from which to make semi-solid fats. It will be noted that the solid fat content is considerably smaller than that of natural oils so that a much higher yield of salad oil is obtained. Also the liquid oil of high keeping qualities must first be prepared in order to produce semi-solid fats having high keeping qualities by further hydrogenation or compounding with saturated fats from other sources.

In making such semi-solid fats from the thus pre-treated oils, the hydrogenation process may be carried on at a more rapid rate under conditions which result in a product of the desired consistency. For example, a rate of hydrogen absorption producing a drop of 40 to 50 iodine numbers per hour has been found satisfactory in practice although a lower rate of hydrogenation may be employed. Due to the presence of the mixed glycerides and the fact that high keeping qualities have been fixed in the pre-treated liquid oil, any reasonably selective catalyst can be employed for this portion of the process, although the more selective the catalyst, the better will be the quality of the resultant fat. In practice it is preferred to use the highly selective foraminate catalysts hereinbefore mentioned. The rapid hydrogenating process may be carried out without removing the oil from the pretreating converter by adding more catalyst and increasing the hydrogen pressure and agitation, or it may be carried out at a subsequent time in other apparatus. I have found that the keeping time of the semi-solid fat produced from the pre-treated oil is dependent upon the keeping time of the pre-treated oil and the linolein content of the semi-solid fat. For soya bean oil, this relation may be expressed approximately by the expression $H=KL^{-\frac{1}{2}}$ where $H$ is the Wesson rancidity time of the semi-solid fat, $L$ is the percent of linolein in the semi-solid fat and $K$ is a constant for any particular batch of pre-treated oil. It will be noted that the keeping time of the semi-solid fat decreases with an increase in linolein. For this reason pre-treated oils hydrogenated to the semi-solid state with ordinary selective catalysts are somewhat inferior to those prepared by using the highly selective catalysts since the linoleic content is somewhat higher.

The value of the factor $K$ can be obtained from the semi-solid fat since $H$ and $L$ can be determined by test. It is equal to the Wesson rancidity time of the fat if hydrogenated to a linolein content of 1% since $H$ is equal to $K$ in the above equation if $L$ is equal to 1. The factor $K$ has also been found to be a straight line function of the Wesson rancidity time of the liquid oil at 110 iodine number approximately in accordance with the expression $K=20.7\ h-118$, where $h$ is the Wesson rancidity time at 110 iodine number. Thus $h$ can be calculated from the composition and Wesson time of the semi-solid fat.

The above relations do not hold for values of $h$ (Wesson rancidity time at 110 iodine number) substantially below 10, that is to say for values of $K$ substantially below 90, nor for values of $H$ (Wesson rancidity time for a semi-solid fat in the margarine or shortening range) substantially below 40. Below these values $K$ is no longer a straight line function of $h$ and the pre-treated oil and semi-solid fat have no substantial resistance to reversion, indicating that these values are critical. The relations are somewhat different for fish oils but the requirement that the oil must be pre-treated so as to have a Wesson rancidity time of at least 10 hours by the time the iodine number has been reduced to approximately 110 still holds.

*Example VI*

As a specific example of forming a high keeping quality semi-solid fat, the liquid hydrogenated soya bean oil resulting from the Example I and having a keeping time of fourteen hours was further hydrogenated at a later time by replacing it in the same converter. The temperature was maintained at 300° F., and 0.2% nickel catalyst resulting from the 6NiO:CrO4 aggregate was employed. The impeller speed was 565 R. P. M., and the hydrogen pressure was 25 lbs. per square inch. A time of one hour and five minutes was required to reduce the iodine number from 113 to 64.7, at which time the resultant semi-solid fat showed the following characteristics and analysis:

| | |
|---|---|
| Iodine number | 64.7 |
| Wiley melting point °C | 40.4 |
| Congeal point °C | 29.9 |
| Wesson rancidity time hours | 107 |
| Saturates per cent | 29.2 |
| Olein do | 68.0 |
| Linolein do | 2.8 |

It will be noted that the linolein content is nearly 3%, yet the keeping time is very high because of a very good pre-treated oil. This linolein content can be reduced to about 1% or less by carrying on the formation of semi-solid fats at a temperature of 310° F.

*Example VII*

As another specific example of the formation of semi-solid fats in accordance with this invention, the liquid oil resulting from the 15,000 pound batch of Example V and having an iodine number of 113 and a keeping time of 16 hours was further hydrogenated at a more rapid rate without removing from the converter by adding .15% more of the same catalyst, increasing the hydrogen pressure to 25 pounds per square inch, and decreasing the temperature to 310° F. The hydrogenation then became more rapid, and the iodine number was reduced from 113 to approximately 65 in about one hour. A semi-solid fat was produced, a sample of which, after laboratory deodorization, showed a Wesson rancidity test time of 208 hours. The product at this stage showed a Wiley melting point of 39.2° C. and a congeal point of 30.6° C. The composition and iodine number were as follows:

| | |
|---|---|
| Saturates per cent | 23.5 |
| Total olein do | 75.5 |
| Linolein do | 1.0 |
| Iodine number | 65.2 |

*Example VIII*

As a further example of forming semi-solid fats, another 15,000 pound batch of soya bean oil was pre-treated under the same conditions as in the above example except that the hydrogen pressure was raised to approximately 5 lbs. per square inch gauge. The pre-treated oil at 115 iodine number had a keeping time of twelve hours. It was then treated in the second stage in exactly the same manner as in the previous example, the hydrogen pressure, amount of catalyst, and time of rapid hydrogenation being very nearly the same. A Wiley melting point of 38° C. and a congeal point of 29.5° C. were obtained at an iodine number of 66.7. The composition and iodine number of this product were as follows:

| | |
|---|---|
| Saturates per cent | 22.9 |
| Total olein do | 76.3 |
| Linolein do | .8 |
| Iodine number | 66.7 |

The keeping time of this product was 130 hours.

It will be observed that the compositions of semi-solid products of the last two examples are substantially the same but that the keeping times varied widely and the better keeping time was obtained by hydrogenating the pre-treated oil having the greater keeping time.

Example IX

As another example of making a high keeping quality semi-solid fat, 160 lbs. of Manchurian soya bean oil were pretreated, in the apparatus employed in the first specific example given in this specification, at a temperature of 310° F. and hydrogen pressure of 10 lbs. per square inch. The impeller speed was 565 R. P. M., and 0.05% nickel catalyst was employed. The iodine number was reduced from 136.5 to 110 in two hours, which is a drop of 13.5 iodine numbers per hour. The oil resulting from this pre-treatment was free from linolenin and had a Wesson rancidity time of 10 hours.

The above pre-treated oil was hydrogenated with .2% nickel catalyst at a hydrogen pressure of 25 lbs. per square inch, impeller speed of 565 R. P. M., and temperature of 300° F. for approximately 1 hour, at which time a semi-solid fat having the following characteristics and composition resulted:

| | |
|---|---|
| Iodine number | 69.8 |
| Wiley melting point °C | 38.0 |
| Congeal point °C | 28.9 |
| Wesson rancidity time hours | 38 |
| Saturates per cent | 25.2 |
| Olein do | 69.4 |
| Linolein do | 5.4 |

This example represents substantially the lower limit of semi-solid fats which can be considered to be of high keeping qualities on which have any substantial resistance to flavor reversion. The Wesson rancidity time of the liquid oil at 110 iodine number is just 10 hours and the Wesson time of the semi-solid fat is but 38 hours.

Example X

As another example of making a high keeping time semi-solid fat, a charge of 160 lbs. of sardine oil was hydrogenated in a converter similar to that shown in the Valentine patent above mentioned. The impeller speed was maintained at 300 R. P. M. during the pre-treatment of the oil so as to prevent splashing, and .2% of the highly selective catalyst, first mentioned, was employed at a temperature of 310° F. and a hydrogen pressure of 15 lbs. per square inch gauge. The liquid oil had an iodine number of 103 and a keeping time of eleven hours. The temperature was then reduced to 300° F., and the impeller speed increased to 565 R. P. M. The hydrogenation was continued until the oil had an iodine number of 70.8, at which time its Wiley melting point was 37.0° C. and its congeal point 30.1° C. This semi-solid product was of lard or butter-like consistency and had a Wesson rancidity time of 25 hours. In general, semi-solid fats from fish oils can be produced by the present invention having an iodine number below 80, a melting point below 40° C., and a keeping time between 25 and 30 hours.

Example XI

As an example of producing a semi-solid fat from a blend of soya bean and fish oil, the liquid oil resulting from Example III was further hydrogenated in the same apparatus with an impeller speed of 565 R. P. M. with the same amount of catalyst at a temperature of 300° F. and hydrogen pressure of 50 pounds per square inch in order to give desired shortening characteristics. The iodine number was dropped from 107 to 76.6 in 1½ hours resulting in a product having a neutral flavor and color, a congeal point of 30.6° C. and a Wiley melting point of 38.4° C. The Wesson rancidity time was 45 hours, which is extremely high for products containing fish oil.

It is to be noted that, even by employing one of the better prior catalysts such as the "Formate" or "Raney" catalysts in the process of hydrogenation herein disclosed, both liquid oils and semi-solid products considerably better than known products result. However, such products do not approach those made by the present process when the highly selective foraminate catalysts are employed. For example, by employing the "Formate" catalyst in the present process, the linolenin can be eliminated from soya bean oil at an iodine number of approximately 105 and with the "Raney" catalyst at an iodine number of approximately 95 and a semi-solid fat having higher keeping qualities than known fats produced. However, by employing the highly selective foraminate catalysts in the pre-treating stage and then the prior catalysts for the rapid hydrogenation to a semi-solid fat, a much better product can be obtained. The distinction between the prior catalysts and the foraminate catalysts is shown by the fact that even rapid hydrogenation, using this catalyst from the original oil to the semi-solid fat without a pre-treating step, produces a better product than any process in which the prior catalysts are employed. By employing a pre-treating stage of hydrogenation followed by rapid hydrogenation, both with the highly selective catalyst, a product having several times the keeping qualities of any fat made by employing the prior catalysts in any stage of the process results.

In the examples of oil or fat compositions given in this specification, the saturates, total olein, and linolein were determined from the thiocyanogen and the iodine numbers, both of which are obtained as a result of titration methods, are more accurate than the older methods involving fatty acid separation, and are standard methods at the present time. The iso-olein was determined by the Twitchell lead salt-alcohol method, which is a standard method at the present time. It is, of course, understood that the original oils hereinbefore described had been treated by the usual refining methods before hydrogenating and that the products of hydrogenation were submitted to the usual steam deodorization before testing for edible properties. The Wesson rancidity tests were conducted under standardized conditions and checked against standard oxygen absorption tests conducted at 100° C. with an air flow of 2⅓ cc. per second with observations of the rate of peroxide formation. The Wesson rancidity tests are well known tests for determining the resistance of glyceride oils and fats to becoming rancid and were carried out as follows:

Absorbent cotton was cut into sheets 4 x 5 inches in size, each weighing approximately 5 grams. Two grams of the oil or melted fat were spread over the center of a sheet of the cotton. One third of the length of the sheet was folded over the top of the distributed oil or fat and the remaining third was then folded over the first one third. The resulting strip was then rolled into a cylinder and placed in a 3½ ounce margarine jar. The cap for this jar, with the paper lining thereof removed, was loosely screwed upon the jar. The jar containing the cylinder was then placed in a forced circulation electric oven held at 100° C.±1° C. by a thermostat control. The contents of the jar was smelled at frequent intervals to detect the break down point, which is determined by the presence of a definitely rancid odor accompanied by the presence of acrolein and other aldehydes. The number of hours required to develop this rancidity point is the Wesson rancidity time.

In this connection, it is noted that the best commercial semi-solid fats prepared from cottonseed oil show a Wesson rancidity time of 18 hours and an oxygen absorption test of 33 hours, while the semi-solid fat prepared from soya bean oil as herein disclosed and having a Wesson rancidity time of 208 hours showed an oxygen absorption test of 425 hours, and that the rate of peroxide formation between various samples will bear the same relationship as the Wesson tests.

This application is a division of my copending application Serial No. 188,785, filed February 4, 1938.

While I have described the preferred embodiment of my invention, it is to be understood that the invention is not limited to the details thereof but may be varied within the scope of the following claims.

I claim:

1. As a product of manufacture, a hydrogenated liquid soya bean oil free from linolenin and having a Wesson rancidity time of at least 10 hours at an iodine number not below 110 and being characterized by having substantial resistance to reversion to the original soya bean oil flavor.

2. As a product of manufacture, a hydrogenated semi-solid soya bean oil product free from linolenin, having a Wesson rancidity time not substantially less than 40 and being characterized by being prepared from a liquid hydrogenated oil free from linolenin and having a Wesson time of at least 10 hours at an iodine number not below 110, said semi-solid product being further characterized by having substantial resistance to reversion to the characteristic soya bean oil flavor.

3. A product of manufacture, a hydrogenated semi-solid soya bean oil product containing no linolenin, having a Wesson rancidity time not substantially less than 40 and a Wesson rancidity time not substantially less than 90 on a basis of 1% linolein, said product being characterized by having substantial resistance to reversion to the original soya bean oil flavor.

4. A semi-solid edible hydrogenated soya bean oil product having Wesson rancidity time not substantially less than 40 and a value of K not substantially less than 90 in the relation $K = HL^{\frac{1}{2}}$ where H is the Wesson rancidity time and L is the percent linolein of the semi-solid fat, said semi-solid fat being free of linolenin and being characterized by having substantial resistance to reversion to the characteristic soya bean oil flavor.

5. As a product of manufacture, a hydrogenated semi-solid fat prepared by hydrogenating a glyceride oil containing a substantial quantity of fatty acid radicals having more than two double bonds, said semi-solid fat being free from fatty acid radicals having more than two double bonds, said semi-solid fat being prepared from a hydrogenated liquid oil having a Wesson time of at least 10 hours at an iodine number not below 110 and being characterized by having substantial resistance to reversion to the flavor of the original oil.

6. A hydrogenated liquid oil prepared from a glyceride oil having a substantial quantity of fatty acid radicals containing more than two double bonds, said liquid oil being free of fatty acid radicals containing more than two double bonds and having a Wesson rancidity time of at least 10 hours at an iodine number not below 110 and being characterized by having substantial resistance to reversion to the flavor of the original oil.

7. A semi-solid fat of margarine or shortening consistency prepared from a glyceride oil containing a substantial quantity of fatty acid radicals having more than two double bonds, said fat being free from fatty acid radicals having more than two double bonds, and being characterized by having been prepared by hydrogenating a hydrogenated liquid oil having a Wesson rancidity time of at least 10 hours at an iodine number not below 110, said fat having substantial resistance to reversion to the flavor of the original oil.

LESLIE G. JENNESS.